United States Patent
Morin

(10) Patent No.: US 6,350,053 B1
(45) Date of Patent: Feb. 26, 2002

(54) KITCHEN DEVICE WITH SAFETY INTERLOCK

(75) Inventor: Gilles Gerard Albert Victor Morin, Vieux (FR)

(73) Assignee: Moulinex S.A., Cormelles le Royal (FR)

( * ) Notice: Subject to any disclaimer, the term of this patent is extended or adjusted under 35 U.S.C. 154(b) by 0 days.

(21) Appl. No.: 09/600,810

(22) PCT Filed: Jan. 22, 1999

(86) PCT No.: PCT/FR99/00139

§ 371 Date: Jul. 24, 2000

§ 102(e) Date: Jul. 24, 2000

(87) PCT Pub. No.: WO99/37193

PCT Pub. Date: Jul. 29, 1999

(30) Foreign Application Priority Data

Jan. 23, 1998 (FR) .............................. 98 00741

(51) Int. Cl.$^7$ .............................. A47J 43/046
(52) U.S. Cl. ........................ 366/205; 241/37.5
(58) Field of Search ........................ 366/96–98, 197, 366/199, 205, 206, 314, 601; 241/37.5, 199.12, 199.2, 277, 282.1, 282.2; 99/348

(56) References Cited

U.S. PATENT DOCUMENTS

| | | | |
|---|---|---|---|
| 1,997,873 A | * | 4/1935 | Poplawski |
| 2,284,155 A | * | 5/1942 | Landgraf |
| 3,128,996 A | | 4/1964 | Kuzara |
| 3,315,946 A | * | 4/1967 | Nissman |
| 3,612,126 A | * | 10/1971 | Emmons et al. |
| 3,713,628 A | * | 1/1973 | Christensen |
| 3,785,579 A | * | 1/1974 | Voglesonger |
| 3,786,999 A | | 1/1974 | Cabell |
| 4,107,791 A | * | 8/1978 | Mikituk |
| 4,297,038 A | * | 10/1981 | Falkenbach |
| 5,323,973 A | * | 6/1994 | Ferrara, Jr. |
| 5,338,111 A | * | 8/1994 | Trocherie et al. |
| 5,353,697 A | * | 10/1994 | Venturati et al. |
| 5,855,431 A | * | 1/1999 | Costanzo |
| 6,059,445 A | * | 5/2000 | St. John et al. |

FOREIGN PATENT DOCUMENTS

| | | | |
|---|---|---|---|
| DE | 2928107 | * | 1/1981 |
| DE | 32 25 591 | | 10/1983 |
| EP | 0 567 853 | | 11/1993 |

\* cited by examiner

Primary Examiner—Charles E. Cooley
(74) Attorney, Agent, or Firm—Young & Thompson

(57) ABSTRACT

A household mixer-blender includes a housing 1 with a reception seat 3. The housing contains an electric motor unit 4 whose output shaft projects into the seat 3. A removable bowl 7 includes a base 9 with a sidewall 10 and is urged to interlock in operating condition on the seat. A central part 12 of the base 9 carries a rotating tool 13 integral with shaft 14 passing through the electric motor unit 4 and base 9. A first safety device includes at least one retractably mounted blocking member 17 is mounted in the reception seat 3. The blocking member is designed to have a first inoperative position in which it is retracted by an actuating member 22 integral with bowl base 23 when the bowl 7 is properly fixed to the base 9, as well as an operative position in which the blocking member is no longer controlled by the actuating member 22 when the bowl 7 is not on the base 9 or is not properly fixed to such base.

10 Claims, 5 Drawing Sheets

KITCHEN DEVICE WITH SAFETY INTERLOCK

BACKGROUND OF THE INVENTION

1. Field of the Invention

The invention relates to kitchen appliances, such as mixers-beaters, comprising a housing having on its upper portion a seat for the reception and enclosure of an electric motor unit whose output shaft projects into the seat, a removable bowl having a removable bottom comprising a base having a sidewall of a shape complementary to the reception seat to nest in operation in said seat and whose central region carries a rotatable tool secured to a shaft passing through said base and adapted to couple with the output shaft of the electrical motor unit, and a first safety device comprising at least one retractably mounted stop adapted to permit coupling the rotatable tool with the output shaft upon retraction of said stop only when the removable bowl is correctly fixed on the base and this base is correctly nested in the reception seat.

2. Description of the Related Art

In known kitchen appliances of this type, the safety devices avoid the possibility of starting the apparatus by a user with the tool carrying base not having the bowl thereon, thereby leaving the tool exposed and hence causing the risk of serious wounding. These safety devices secured to the base are relatively complicated to produce and their employment therefore gives rise to high cost. Moreover, the base being a portion of the kitchen equipment subject to be soiled, its cleaning requires the user to take careful precautions by avoiding any passage of the valve under tap water or into a dish pan to prevent problems of corrosion of the pieces constituting said safety device, thereby to increase the life of the kitchen appliance.

SUMMARY OF THE INVENTION

The present invention has for its object to overcome the mentioned drawbacks and to provide a kitchen appliance in which the safety device will be of reliable and economical construction, adapted to mass production and easy to use.

According to the invention, the stop is retractably mounted into the reception seat between an inactive position in which it permits the seating of the base on the reception seat and in which it is retracted by an actuating means secured to the base of the bowl when said bowl is correctly fixed on the base, and an active position in which it projects in the direction of the output shaft and of which a portion comes into engagement with at least one notch formed in the sidewall of the base so as to prevent coupling of the rotatable tool with the output shaft and in which it avoids the actuating means when the bowl is not present or is incorrectly fixed on the base. Thus, thanks to the stop fixed on the reception seat, the first safety device permits in a simple way, whilst guaranteeing the possibility of cleaning the bowl with the base under tap water or in a dish pan, obtaining absolute safety for the user by preventing the coupling of the rotatable tool fixed on the base when the bowl is not present or is incorrectly locked on the base.

According to another characteristic of the invention, the bowl being fixed by rotation on the base, the kitchen appliance comprises a second safety device adapted to prevent the reverse rotation of the bowl on the base when the base, on which the bowl is correctly mounted, is seated correctly in the reception seat.

This second safety device thus permits, after locking the bowl-base assembly on the reception seat, providing a unitary kitchen appliance which has high reliability as well as good handling properties during its use. Moreover, such a safety device preventing the removal of the bowl in bowl-base assembly is corrected fixed on the reception seat, prevents any improper handling by the user, particularly unlocking the bowl from the base after use, which could give rise to serious consequences, namely abrupt opening of the bottom of the bowl and hence burning in the case of a hot preparation contained within the bowl or soiling the kitchen appliance and the working surface on which said kitchen appliance rests.

BRIEF DESCRIPTION OF THE DRAWINGS

The characteristics and advantages of the invention will become further apparent from the description which follows, by way of non-limiting example, with reference to the accompanying drawings, in which.

DESCRIPTION OF THE PREFERRED EMBODIMENTS

Figure 1:
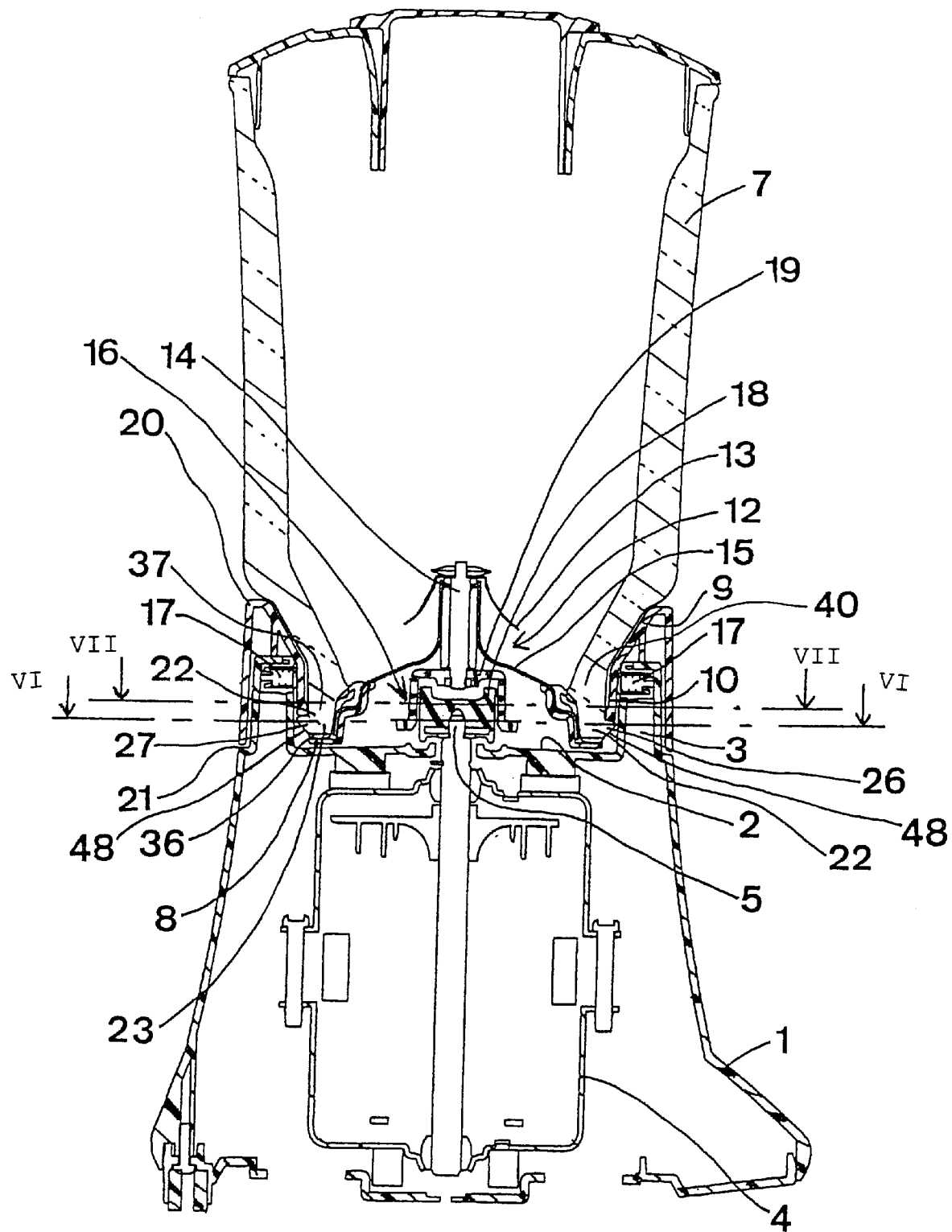
FIG. 1 is a schematic cross-sectional view of a kitchen appliance provided with a first safety device according to the invention and using a bowl associated with a base provided with inactive position stops, the bowl-base assembly being received in a reception seat of the housing of the kitchen appliance.
Figure 2:
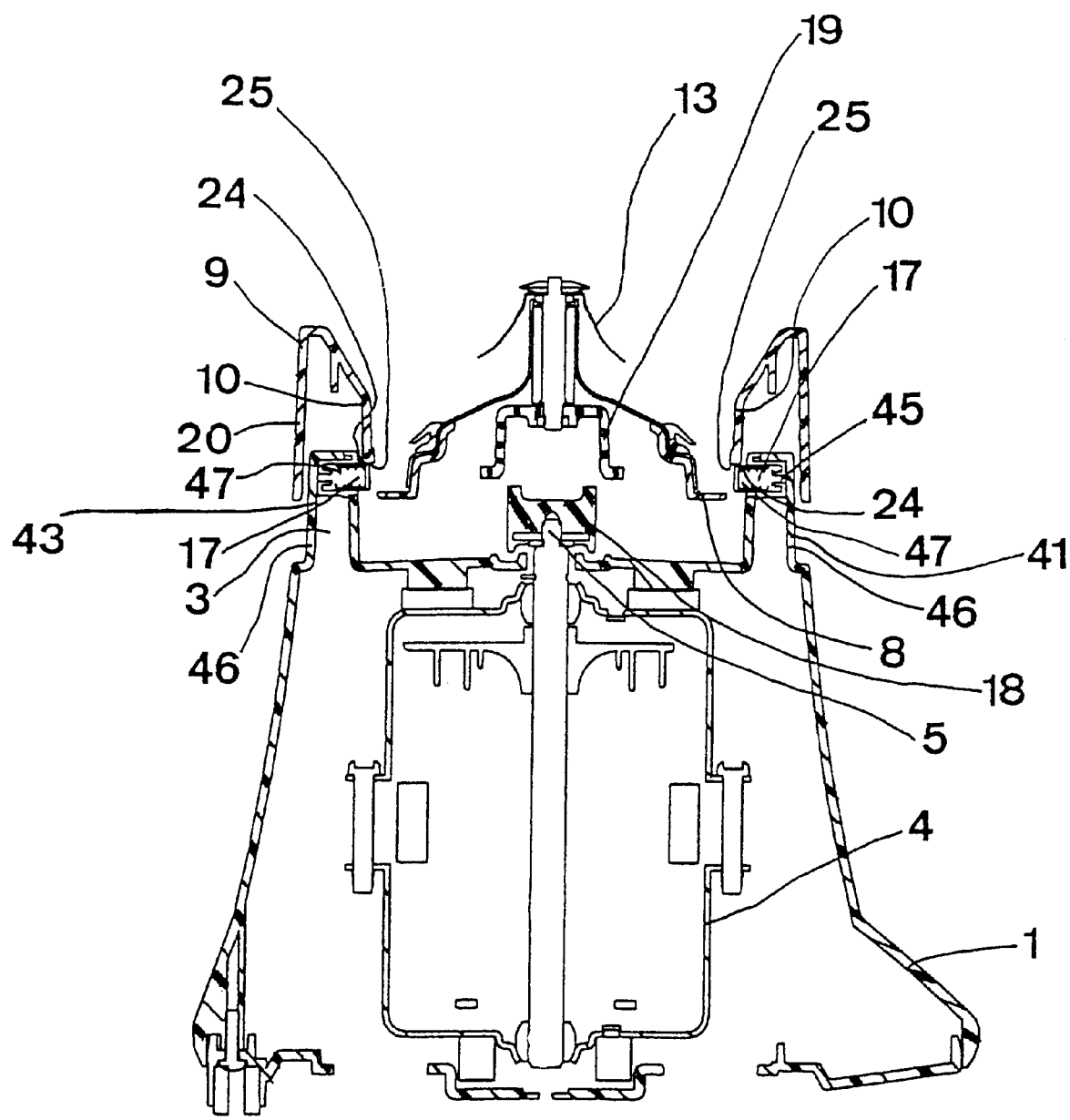
FIG. 2 is a view similar to FIG. 1, but showing the base without the bowl and the stops in the active position.

The kitchen appliance shown in FIGS. 1 and 2 is a mixer-beater comprising a housing 1 having on its upper portion 2 a reception seat 3 and enclosing an electric motor unit 4 whose output shaft 5 projects into the reception seat 3, a removable bowl 7 having a removable bottom 8 comprising a base 9 having a sidewall 10 of a shape complementary to the reception seat 3, which nests in operation on the upper portion 2 and whose central region 12 carries a rotatable tool 13, such as a knife, secured to a shaft 14 passing through the bottom wall 15 of the base 9 and adapted to couple with the output shaft 5 of the electric motor unit 4 with the help of a coupling device 16, and a first safety device comprising at least retractably mounted stop 17 adapted to permit the coupling of the rotatable tool 13 with the output shaft 5 upon retraction of said stop 17, only when the removable bowl 7 is correctly fixed on the base 9 and said base 9 is correctly seated in the reception seat 3.

Figure 4:
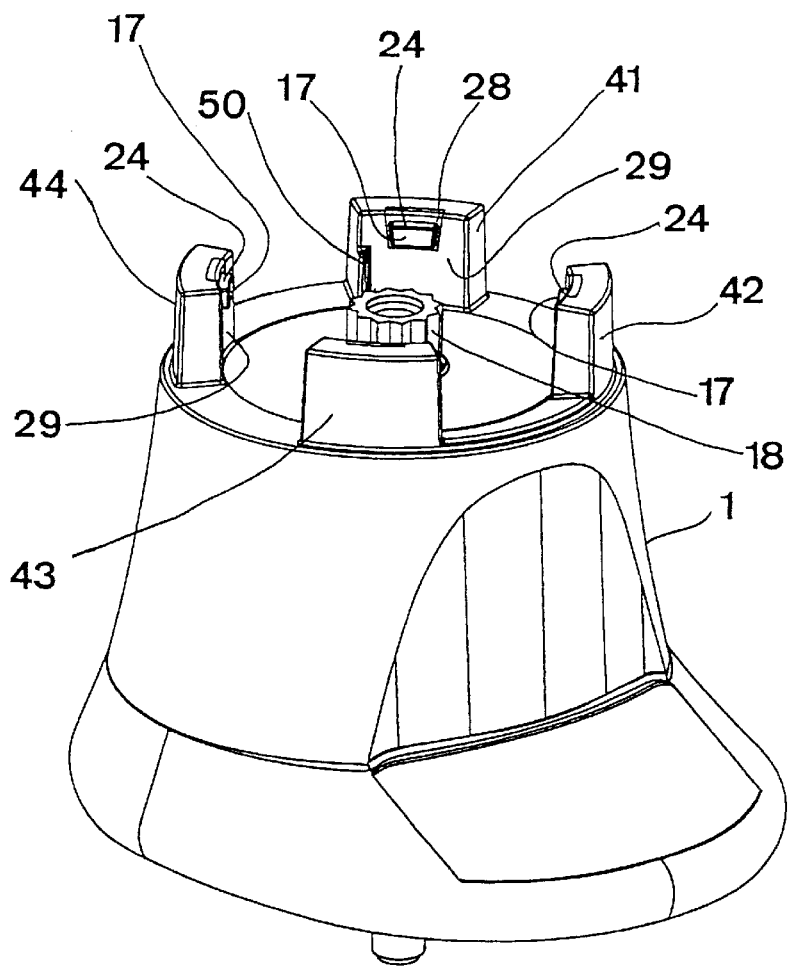
FIG. 4 is a perspective view of the housing of the kitchen appliance showing the reception seat formed by annular projections of which each is provided with a stop shown in the active position.

As shown in FIG. 4, the reception seat 3 comprises four annular projections 41, 42, 43 and 44 forming crenelations on the upper portion 2. The stop 17 is movably mounted in at least one of said annular projections 41, 42, 43 and 44. In the example shown in FIG. 4 and as preferably constructed, each of the projections 41, 42, 43 and 44 comprises a stop 17. Each stop 17 is retractably mounted through an opening 28 provided in the inside lateral surface 29 of the annular projections 41, 42, 43 and 44 forming the reception seat 3 and comprises a portion 24 which projects from the opening 28 when the bowl 7 is not present or is incorrectly fixed on the base 9.

The coupling device 16, in a way known per se, comprises a rubber drive 18 mounted at the end of the output shaft 15 of the electric motor 4 and is capped by a rigid bell 19 carried by the shaft 14.

A sidewall 10 of the base 9 is prolonged by a skirt 20 which covers the reception seat 3 and which is adapted to come into engagement with the peripheral edge 21 of the upper portion 2 of the housing 1.

According to the invention, the stop 17 is retractably mounted into the reception seat 3 between an inactive position in which it permits seating of the base 9 in the reception seat 3 and in which it is retracted by actuating means 22 secured to the base 23 of the bowl 7 when said bowl 7 is correctly fixed on the base 9, and an active position in which it projects in the direction of the output shaft 5 and whose portion 24 comes into engagement with at least a notch 25 formed in the sidewall 10 of the base 9 so as to prevent coupling of the rotatable tool 13 with the output shaft 5 and in which it avoids the actuating means 22 when the bowl 7 is not present or is incorrectly fixed on the base 9.

Figure 5:
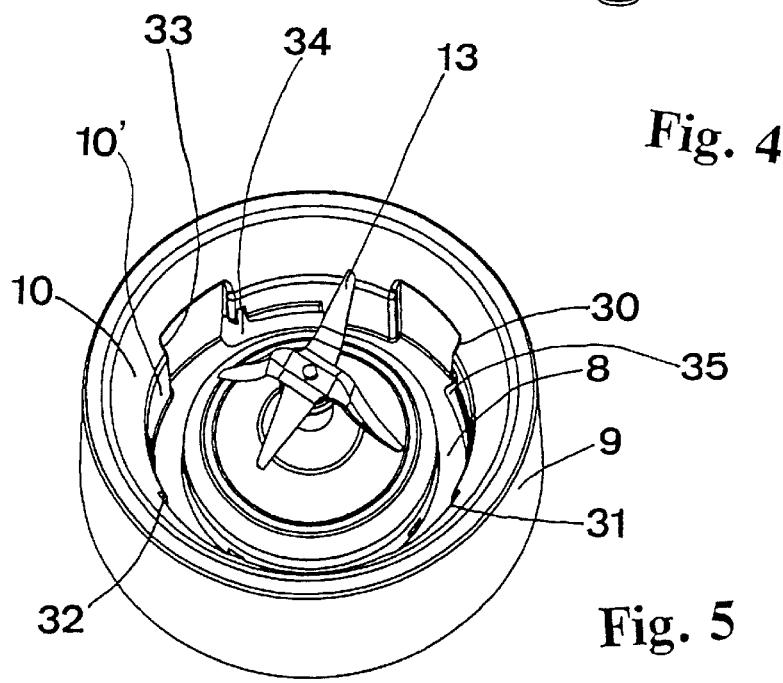
FIG. 5 is a perspective view of the base of the kitchen appliance shown in FIG. 1.

According to a first embodiment shown in FIGS. 1, 2, 3, 6 and 7, the securement of the bowl 7 on the base 9 is achieved by means of a bayonet locking device comprising on the side surface 40 of the base 23 of the bowl 7 a plurality of lugs of which two, 26 and 27, are shown and constitute the actuating means 22. As shown in FIG. 5, the sidewall 10 of the base 9 comprises, in its internal surface 10', on the one hand, recesses 30, 31, 32 and 33 in which, in the course of assembly of the bowl 7 on the base 9, are adapted respectively to engage four lugs 26, 27, 26' and 27' of the bowl 7 and, on the other hand, openings of which two, 34 and 35, are shown in FIG. 5, in which, at the end of assembly of the bowl 7 on the base 9, said lugs 26, 27, 26' and 27' snap in and which open on the external surface 10" of the base 9 such that, during positioning of the bowl-base assembly on the reception seat 3, the lug 26 will face the stop 27 so as to retract it. So as to obtain good sealing of this securement, an annular joint 36, shown in FIG. 1, is interposed between the bottom 8 of the base 9 and the edge 37 of the bowl 7.

Figure 3:
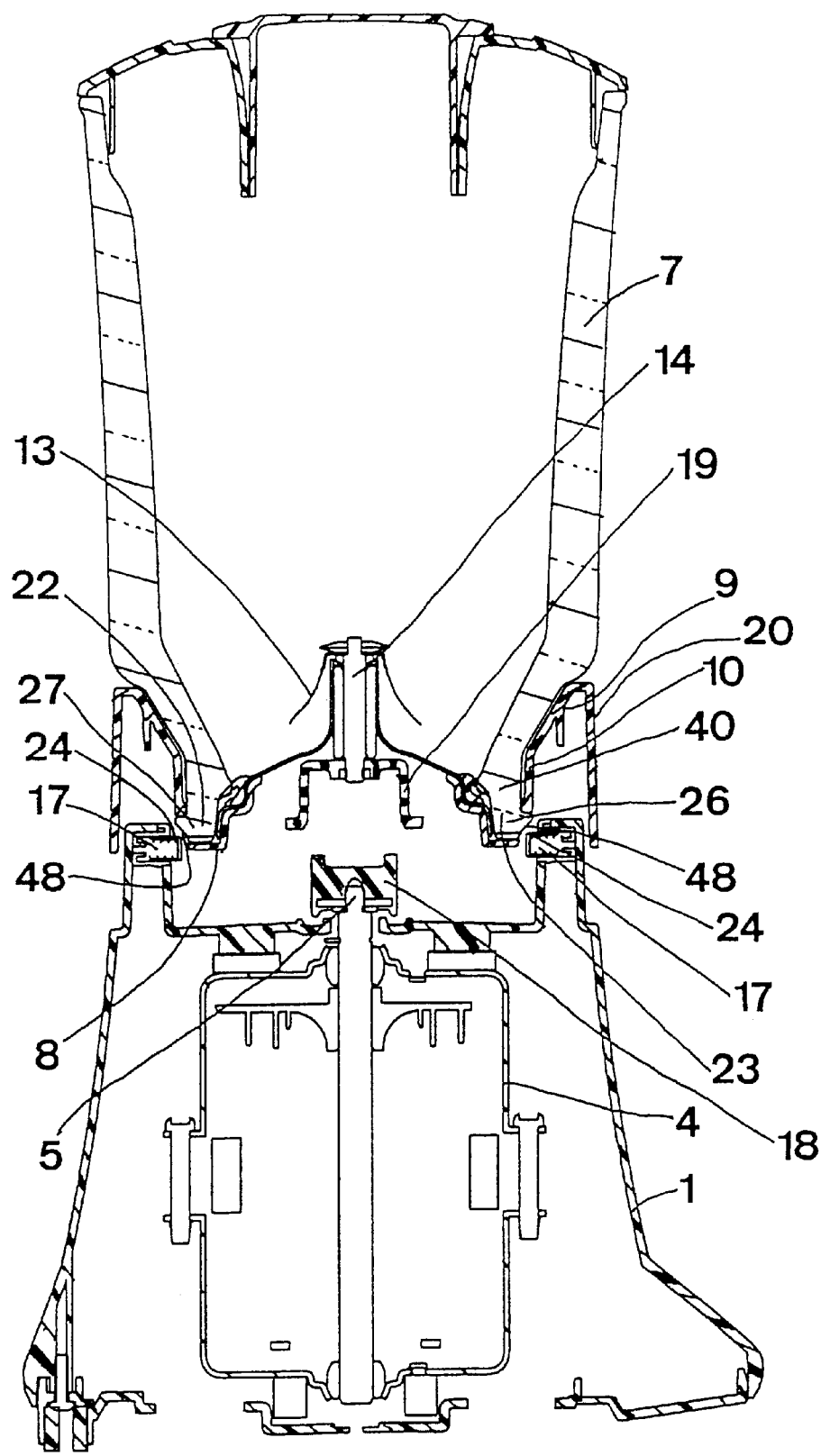
FIG. 3 is a view similar to that of FIG. 1, showing the base provided with the bowl before its seating in the reception seat.

As shown in FIGS. 2, 3 and 4, each stop 17 is movably mounted against resilient means which tends to return it to its active position.

As is seen in FIG. 2, said resilient means is, for example, a compression spring 47 arranged between the stop 17 and a seat 45 secured to the external side surface 46 of the annular projections 41, 42, 43 and 44.

In the example shown in FIGS. 1 and 3, the lug 26 or 27 forming the actuating means 22 comprises a portion 48 forming a ramp adapted to retract the portion 24 during positioning of the bowl-base assembly on the annular projections 41, 42, 43 and 44 forming the reception seat 3.

Figure 6:
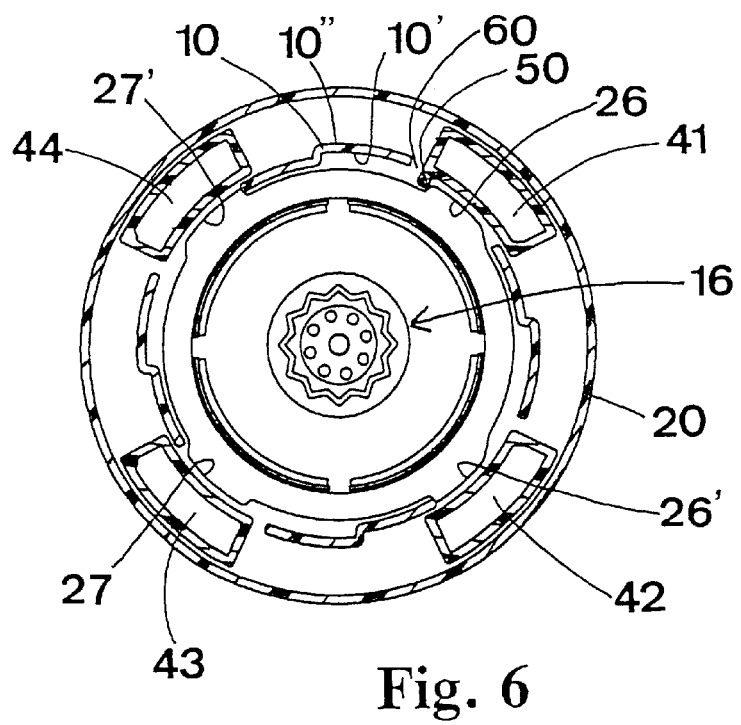
FIG. 6 is a horizontal cross-sectional view on the line VI—VI of FIG. 1 showing the bowl-base assembly nested in the annular projections forming the reception seat as well as a second safety device locking the bowl on the base.
Figure 7:
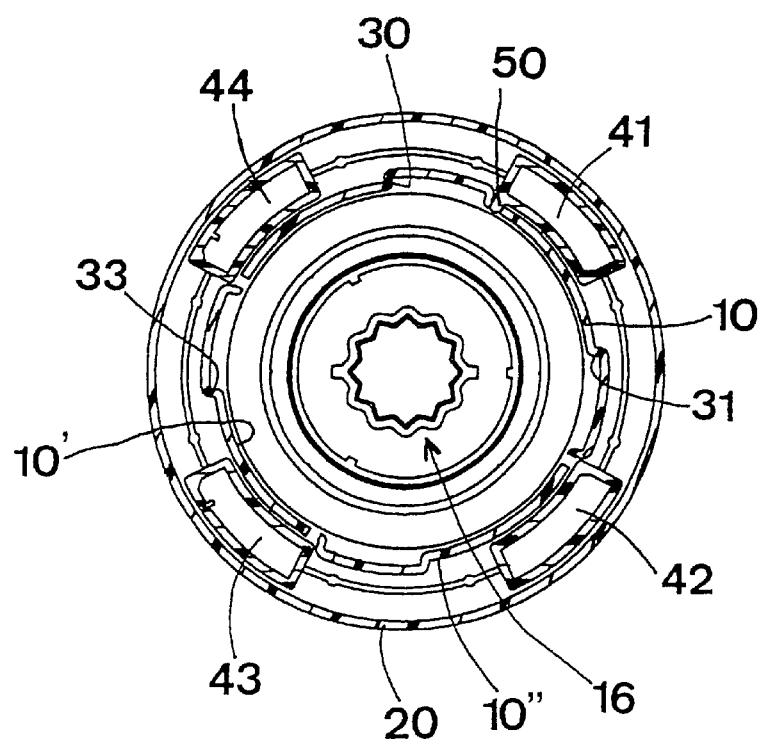
FIG. 7 is a horizontal cross-sectional view on the line VII—VII of FIG. 1 showing the lateral wall of the base as well as the position of said base on the annular projections.

As shown in FIGS. 4, 6 and 7, the bowl 7 being fixed by rotation on the base 9, the kitchen appliance comprises a second safety device adapted to prevent the reverse rotation of the bowl 17 on the base 9 when the base 9, on which is correctly mounted the bowl 7, is correctly seated in the annular projections 41, 42, 43 and 44. The bowl 7 being fixed by rotation on the base 9 for example by means of the bayonet locking device, the second safety device comprises a piece 50 forming an abutment provided on one, 41, of the annular projections, projecting in the direction of the output shaft 5 and engaging with at least one, 26, of the lugs 26, 27, 26' and 27' of the base 23 of the bowl 7 through a gap 60 provided in the sidewall 10 of the base 9. Thus, as shown in FIGS. 4 and 6, when the bowl-base assembly is seated in the annular projections 41, 42, 43 and 44, the lug 26 is blocked by the piece 50 and the bowl 7 is thus locked in rotation on the base 9.

According to a second embodiment (not shown), the removable securement of the bowl 7 on the base 9 is obtained by means of a screwthreaded connection. To this end, the bowl 7 comprises a helicoidal rib whose internal sector constitutes the actuating means and the sidewall of the base comprises a helicoidal groove of complementary shape to the rib and in its lower portion has an opening which communicates with the external sidewall of the base and through which opens the lower sector such that, during positioning of the bowl-base assembly on the reception seat, the lower sector will be facing the stop 17. Thus, during seating of the bowl-base assembly on the reception seat, the lower sector comprising the portion 48 forming a ramp will retract the portion 24 of the stop 17.

It should be emphasized that other embodiments of removable securement of the bowl 7 on the base 9 are conceivable and that the described examples are not limiting.

Thanks to the first safety device according to the invention, it will be understood that after a correct securement of the bowl 7 on the base 9 and a correct seating of the bowl-base assembly in the reception seat 3, there is obtained a mixer-beater having high safety during use. Moreover, this second safety device permitting not retracting the bowl 7 from the base 9 when the bowl-base assembly is corrected seated on the reception seat 3, protects the user against poor handling during use of the kitchen appliance.

The operation of the mixer-beater provided with the first and second safety devices according to the invention is the following:

In the case in which the user does not correctly screw the bowl 7 onto said base or else did not correctly position the bowl 7 on said base 9, the stops 17 are not moved and the portions 24 are therefore under the influence of compression springs 47, in an active position preventing the seating of the base or the bowl-base assembly on the reception seat 3. There is thus prevented any coupling between the bell 19 and the drive 18 such that the apparatus, even if it is started by a switch (not shown), cannot drive the rotating tool 13. Moreover, given the number of stops 17 on the reception seat 3, there is no inadvertent operation and absolute safety is guaranteed.

To use the apparatus, one therefore correctly emplaces the bowl 7 on the base 9 such that the lugs 26, 27, 26' and 27' actuate and retract the stops 17 mounted on the annular projections 41, 42, 43 and 44. Thus, if all the portions 24 of the stops 17 are correctly retracted, the seating of the bowl-base assembly in the reception seat 3 and the coupling of the bell 19 to the drive 18 are made possible.

Moreover, after such a seating, the piece 50 provided on the annular projection 41 forms an abutment for the lug 26 of the bowl 7 and prevent any unlocking of the bowl 7 from the base 9 by reverse rotation of said bowl 7 on the base 9. It will thus be understood that, thanks to the presence of the piece 50, when a user wishes to uncouple the bowl 7 from the base 9, he must first remove the bowl-base assembly from the reception seat 3 so as to avoid said piece 50, then proceed to unlocking the bowl 7 relative to the base 9 by a reverse rotation. In the course of this operation, the lugs 26, 27, 26' and 27' free themselves from the openings 34, 35 and open into the recess 30, 31, 32 and 33, promoting the axial freeing of the bowl 7 from the base 9. As a result, thanks to the second safety device, any uncoupling of the bowl 7 from the base 9 is impossible when the bowl-base assembly is seated correctly on the reception seat 3, and the safety, during use of the kitchen appliance, is a maximum.

I claim:

1. Kitchen appliance comprising a housing (1) having on an upper portion (2) a reception seat (3) and enclosing an electric motor unit (4) so that an output shaft (5) of the electric motor unit projects into the seat (3), a removable bowl (7) having a removable bottom (8) comprising a base (9) having a sidewall (10) of a shape complementary to the shape of the reception seat (3) to be seated in operation on said seat, a central region (12) of the base carrying a rotatable tool (13) secured to a shaft (14) passing through said base (9) of the electric motor unit (4), and a first safety device comprising at least one retractably mounted stop (17) and adapted to permit the coupling of the rotatable tool (13) with the output shaft (5) following retraction of said stop (17), only when the removable bowl (7) is correctly fixed on the base (9) and said base (9) is correctly seated in the reception seat (3), characterized in that the stop (17) is retractably mounted in the reception seat (3) between an inactive position in which the stop permits the seating of the base (9) on the reception seat (3) and in which the stop is retracted by an actuating means (22) secured to the base (23) of the bowl when said bowl (7) is correctly fixed to the base (9), and an active position in which the stop projects in the direction of the output shaft (5) and of which a portion (24) comes into engagement with at least one notch (25) formed in the sidewall (10) of the base (9) so as to prevent the coupling of the rotatable tool (13) with the output shaft (5) and in which the stop avoids the actuating means (22) when the bowl (7) is not present or incorrectly fixed on the base (9).

2. Kitchen appliance according to claim 1, characterized in that the stop (17) is retractably mounted through an opening (28) provided in the internal side surface (29) of the reception seat (3) and comprises the portion (24) which projects from said opening (28) when the bowl (7) is not present or incorrectly fixed on the base (9).

3. Kitchen appliance according to claim 2, characterized in that the securement of the bowl (7) on the base (9) is obtained by means of a bayonet locking device comprising on the lateral surface (40) of the base (23) of the bowl (7) a plurality of lugs (26, 27, 26' and 27') constituting the actuating means (22) and in that the sidewall (10) of the base (9) comprises, in an internal surface (10') of the sidewall, recesses (30, 31, 32 and 33) in which, in the course of assembly of the bowl (7) on the base (9), are adapted to engage respectively four lugs (26, 27, 26' and 27') of the bowl (7), the internal surface of the sidewall further comprising openings (34 and 35) in which, at the end of assembly of the bowl (7) on the base (9), said lugs (26, 27, 26' and 27') will snap in and open on the external surface (10") of the base (9) such that, during positioning of the bowl-base assembly on the reception seat (3), one of the lugs will face the stop (17).

4. Kitchen appliance according to claim 3, further comprising a second safety device, wherein when the bowl (7) is fixed by rotation on the base (9), the second safety device is adapted to prevent reverse rotation of the bowl (7) on the base (9) when the base (9), together with the bowl correctly mounted on the base, is correctly seated on the reception seat (3).

5. Kitchen appliance according to claim 4, wherein the reception seat (3) comprises annular projections (41, 42, 43 and 44), the stop (17) being movably mounted in at least one of the annular projections, and wherein the second safety device comprises a piece (50) forming an abutment provided on one of the annular projections (41, 42, 43 and 44), projecting in the direction of the output shaft (5) and through a gap (50) provided in the sidewall (10) of the base (9).

6. Kitchen appliance according to claim 2, characterized in that the removable securement of the bowl (7) on the base (9) is obtained by means of a screwthreaded securement, the bowl (7) comprising for this purpose a helicoidal rib having a lower sector which constitutes the actuating means (16), the sidewall (10) of the base (9) comprising a helicoidal groove of a shape complementary to that of the rib, a lower portion of the sidewall having an opening which communicates with the external sidewall (10") of the base (9) and through which opens the lower sector such that, during positioning of the bowl-base assembly on the reception seat (3), the lower sector will be facing the stop (17) to retract the stop.

7. Kitchen appliance according to claim 1, characterized in that the actuating means (22) is provided on the side surface (40) of the base (23) of the bowl (7) and comprises a projecting portion (48) forming a ramp adapted to retract the portion (24) during positioning of the bowl-base assembly on the reception seat (3).

8. Kitchen appliance according to claim 1, characterized in that the reception seat (3) comprises annular projections (41, 42, 43 and 44), the stop (17) being movably mounted in at least one of the annular projections (41, 42, 43 and 44).

9. Kitchen appliance according to claim 8, characterized in that the projections being four in number (41, 42, 43 and 44), each annular projection (41, 42, 43 and 44) comprises a stop (17).

10. Kitchen appliance according to claim 1, characterized in that the stop (17) is movably mounted against a resilient means which tends to return the stop to the stop's active position.

* * * * *